No. 793,248. PATENTED JUNE 27, 1905.
S. L. THRIFT & J. A. LOUTTIT.
NUT LOCK.
APPLICATION FILED MAR. 28, 1905.
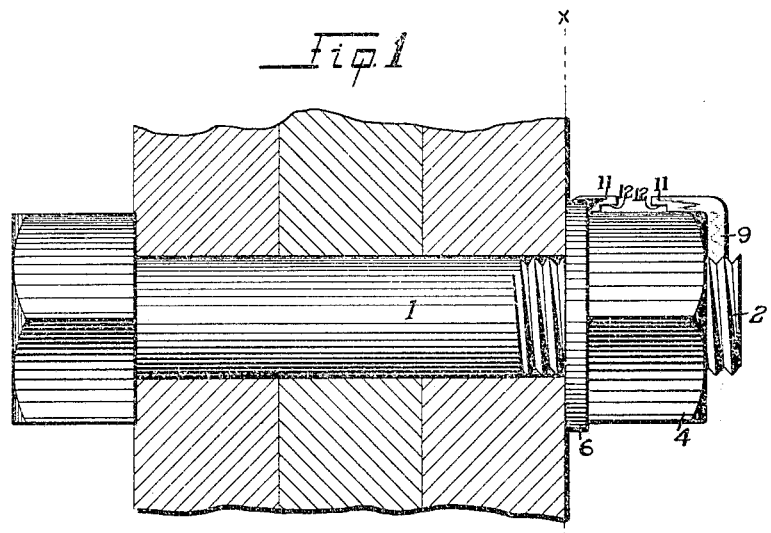
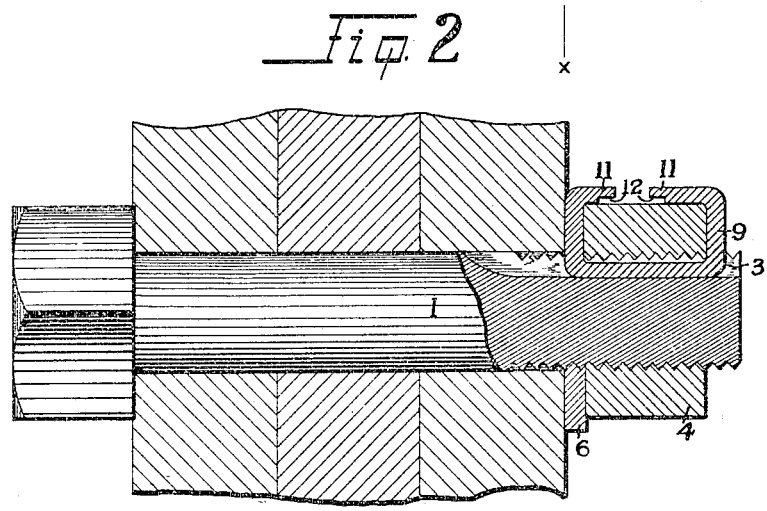
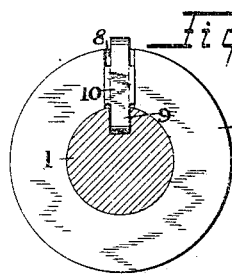 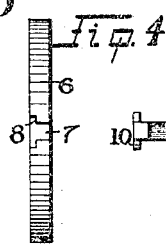 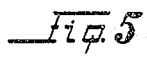
Witnesses
J. Herbert Carter,
Percy S. Webster.
Inventors
Samuel L. Thrift, and
James A. Louttit.
By Joshua B. Webster
Attorney No. 793,248. Patented June 27, 1905.

UNITED STATES PATENT OFFICE.

SAMUEL L. THRIFT AND JAMES A. LOUTTIT, OF STOCKTON, CALIFORNIA.

NUT-LOCK.

SPECIFICATION forming part of Letters Patent No. 793,248, dated June 27, 1905.

Application filed March 28, 1905. Serial No. 252,453.

*To all whom it may concern:*

Be it known that we, SAMUEL L. THRIFT and JAMES A. LOUTTIT, citizens of the United States, and residents of Stockton, in the county of San Joaquin and State of California, have invented certain useful Improvements in Nut-Locks, of which the following is a specification.

Our invention relates to improvements in nut-locks; and our object is to produce a simple, cheap, and effective nut-lock and also one which may be easily unlocked when it is so desired. This object we accomplish by the simple and peculiar construction herein described, and pointed out in the claim appended.

In the drawings similar characters of reference indicate corresponding parts in all the views.

Figure 1 is a side elevation showing the nut locked. Fig. 2 is a sectional view of same. Fig. 3 is a view taken on a line $x\ x$ of Fig. 1. Fig. 4 is a top plan view of a washer. Fig. 5 is a top plan view of a locking-pin.

1 designates the bolt, and 2 the threaded portion thereof. 3 is a longitudinal groove in the lateral face of the bolt, and 4 is an ordinary plain nut mounted on said bolt. 6 is a washer encircling the said bolt at the inner end of the nut, said washer being provided with a radial slot 7, said slot having an enlarged portion 8 at the inner side thereof.

9 is a locking-pin provided with a flange 10, adapted to fit into the enlarged portion 8 of the slot 7, the pin proper being adapted to fit into the slot 3 and bend, so as to fit into the slot 7, and then both ends are bent over the side of the nut, thus locking said nut securely to the bolt. It is necessary, however, to be able to unlock the nut easily also. For this purpose we have provided a reduced portion 11 at each end of the pin 9, so as to leave recesses 12 between it and the nut, and thus any instrument may be inserted under said pin and bend the ends back, so that the nut may be unscrewed. The purpose of the slot 8 being adapted to receive the flange 10 is to prevent the pin 9 from being displaced while the nut is being advanced on the threaded portion 2. In practice only one end of the said pin 9 need be bent over the side of the nut; but of course both make a surer lock.

One great advantage of our invention over others is that we are able to use a plain ordinary nut without grooving or otherwise changing it.

Many changes in the form and details of our invention may be resorted to at will without departing from the spirit thereof. Hence we consider ourselves entitled to all forms of the invention as may fall within the intent of our claim.

Having thus described our invention, what we claim as new and useful, and desire to secure by Letters Patent, is—

In a nut-lock the combination of a bolt, a longitudinal slot in the lateral face thereof, a washer mounted on said bolt and provided with a radial slot coinciding with said longitudinal slot, said radial slot having an enlarged portion on the inner side of the said washer, a nut mounted on the bolt, a locking-key secured in said longitudinal slot and provided with a suitable flange adapted to fit into said enlarged portion of said radial slot, said key being bent over the outer face and side of the nut.

In testimony whereof we sign our names to this specification in the presence of two subscribing witnesses.

SAMUEL L. THRIFT.
JAMES A. LOUTTIT.

Witnesses:
P. STOWE WEBSTER,
F. HERBERT CARTER.